March 28, 1939.  L. N. MESSING ET AL  2,151,930
TREATING FUR SKINS
Filed March 24, 1937  3 Sheets-Sheet 3

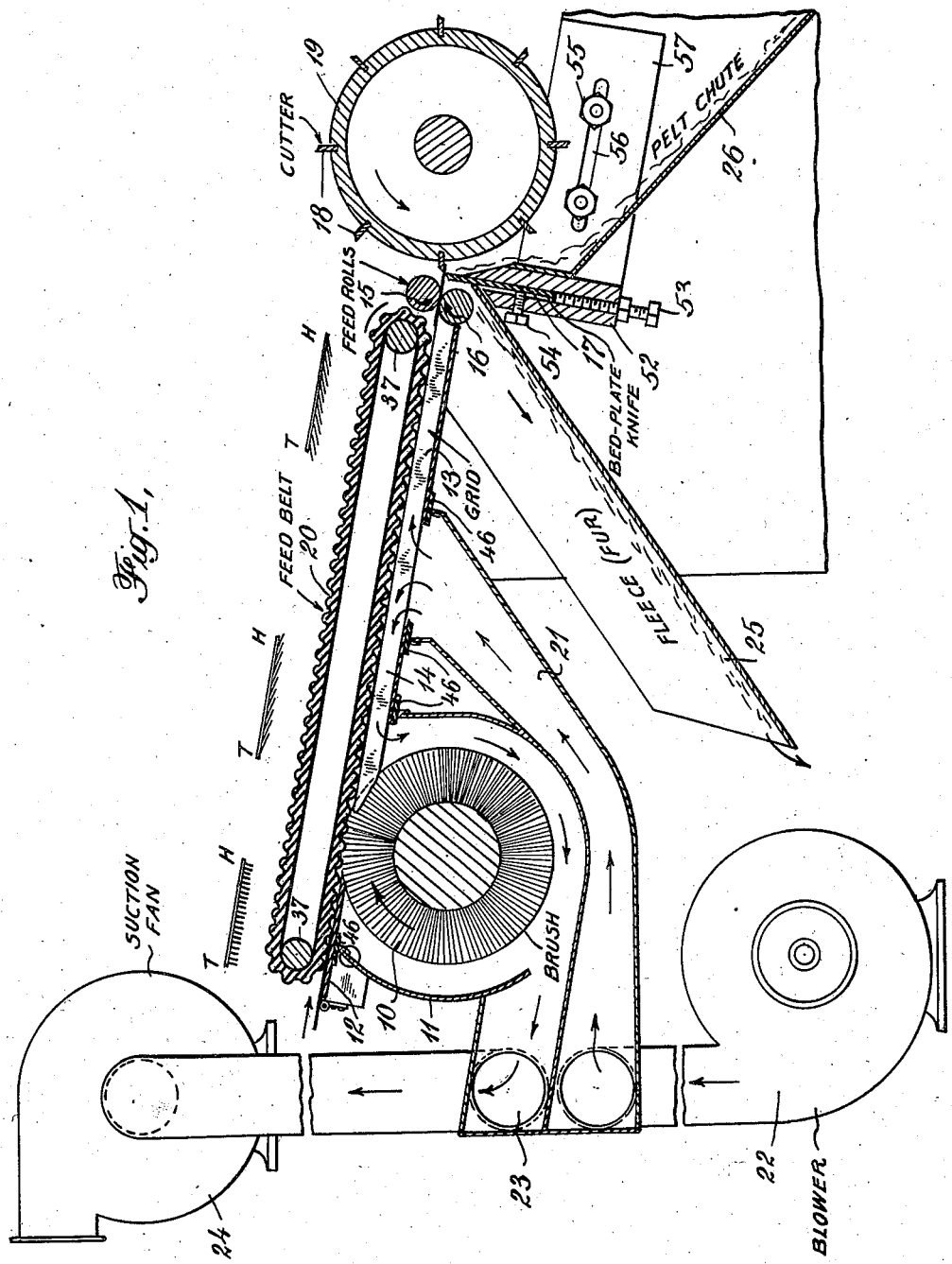

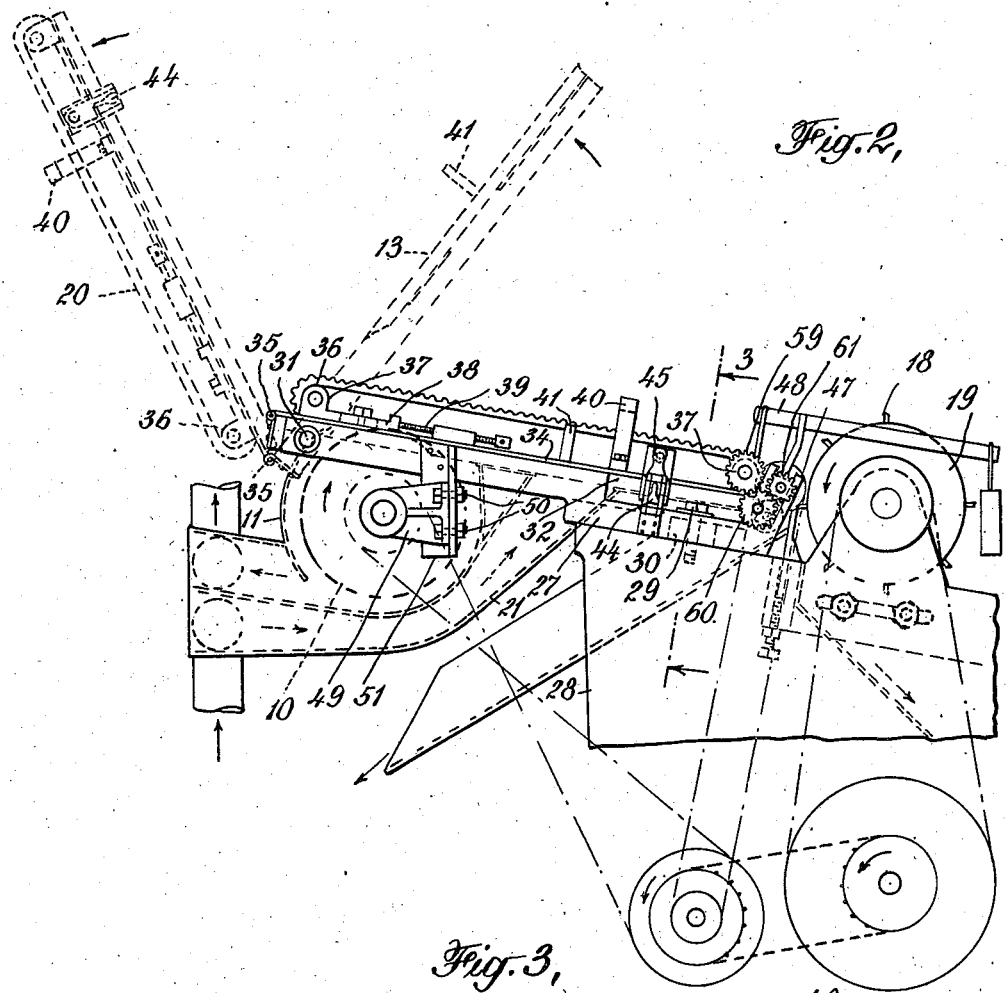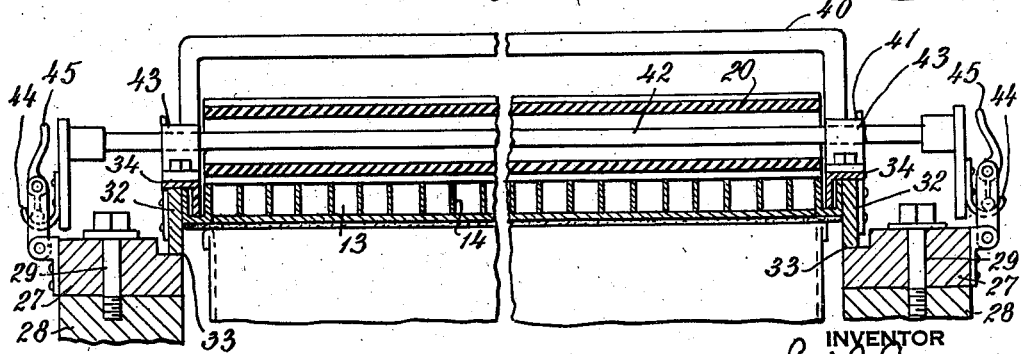

INVENTOR
Louis N. Messing +
BY Robert E. Neuinberg
Pennie, Davis, Marvin & Edmonds
ATTORNEYS Patented Mar. 28, 1939

2,151,930

UNITED STATES PATENT OFFICE 2,151,930

TREATING FUR SKINS

Louis N. Messing and Robert E. Naumburg, New York, N. Y., assignors to Jonas & Naumburg Corporation, New York, N. Y., a corporation of New York Application March 24, 1937, Serial No. 132,740

19 Claims. (Cl. 19—2)

This invention relates to improvements in treating animal skins and has for its principal object the provision of an improved method and machine for cleaning and brushing the skins to prepare the fur for the defleecing operation and feeding the brushed skins to the cutter where the fleece is removed and separated from the defleeced pelts. In carrying out our invention the skins, preferably carroted, are brushed against the grain, that is from the tail to the head, to separate the hairs and free any adhering dust and dirt. The skins are then subjected to air currents passing from head to tail which remove the dust and dirt and lay the hairs back in the natural position. The skins thus prepared are fed head-forward between feed rolls to a defleecing cutter which slices off narrow strips of the pelt and separates the fleece from it.

We have illustrated a preferred embodiment of the machine of our invention in the accompanying drawings in which—

Figure 1 is a transverse vertical section through the machine,

Figure 2 is a side elevation of the machine on a somewhat reduced scale,

Figure 3 is a transverse section taken along line 3—3 of Figure 2, and

Figure 4:
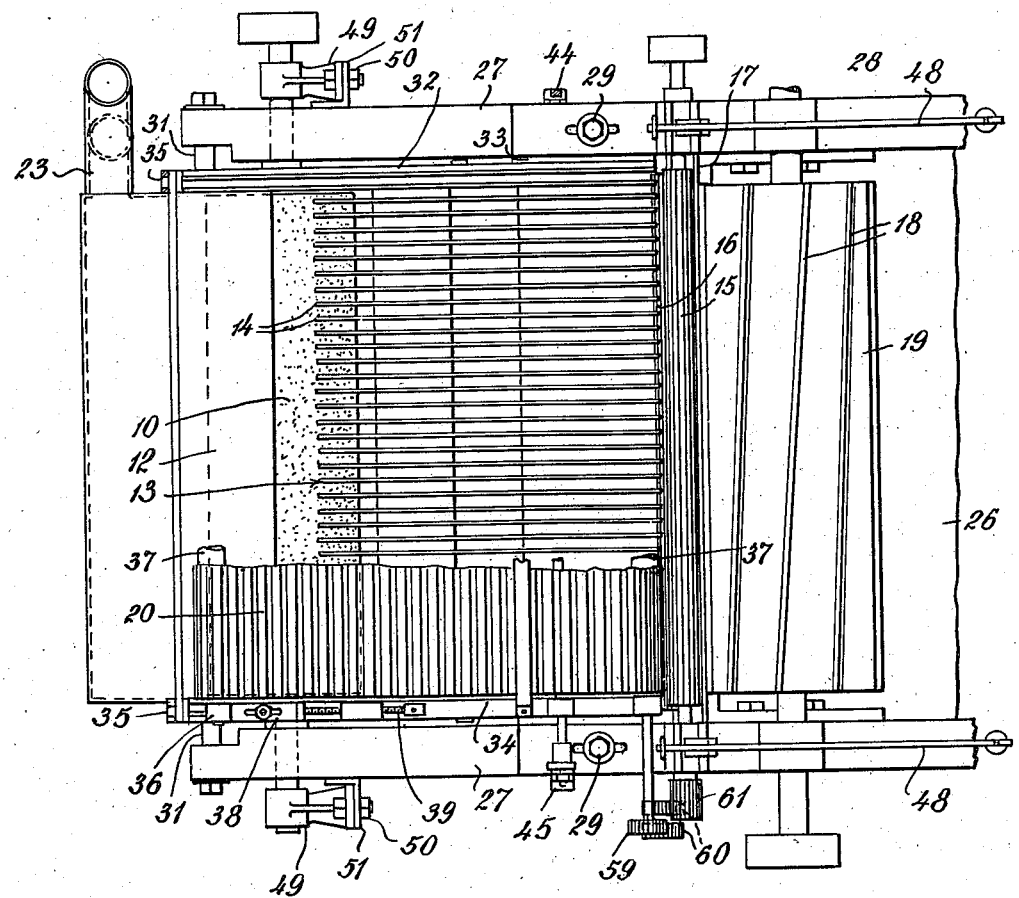
Figure 4 is a plan view of the machine with certain of the parts broken away.

In these drawings 10 represents a rotary bristle brush mounted within a housing 11 and extending slightly beyond an inclined skin-receiving platform 12. On the other side of the brush and in alignment with the platform 12 is a grid 13 made up of a series of spaced thin ribs 14 placed on edge. The upper ends of these ribs extend well into the bristles of the brush; their lower ends terminate adjacent a pair of feed rolls 15 and 16 mounted closely adjacent the defleecing cutter which comprises a bed-plate knife 17 cooperating with a series of helical blades 18 of a rotary knife cylinder 19.

Overlying and in contact with the platform 12 and the grid 13, is a feed belt 20 made of some suitable flexible material, such as rubber, and provided with a corrugated face designed to engage the pelt side of the skins and feed them over the brush and the grid to the feed rolls and the cutter.

Communicating with the lower side of the grid 13 is an air duct 21 through which air is blown from a blower 22, the air from the duct 21 reaching the grid being deflected to the right and to the left by the skins and the feed belt, the major portion passing left toward the brush, enters the brush housing and passes out through a duct 23 and through an exhaust fan 24. Because of the action of this exhaust fan only a small part of the air from the blower 22 passes to the right as it leaves the duct 21.

Mounted directly below the feed rolls 15 and 16 is a fleece chute 25 which receives the fleece from th cutter and deposits it on a moving belt, not shown, or into any suitable receptacle. On the other side of the bed-plate knife 17 and below the rotary knife cylinder 19 is a pelt chute 26 which receives the cut pelt from the cutter and deposits it in a suitable receptacle, or elsewhere.

We shall now describe, in somewhat greater detail, the construction and mountings of the various parts of the machine, with particular reference to Figures 2, 3 and 4. A pair of arms 27 are adjustably mounted on the frame 28 of the machine by means of bolts 29 extending through slots 30. Pivotally mounted at 31, near the outer ends of these arms, are a pair of side members 32 supported at their inner ends on shoulders 33 on the arms 27, and they in turn support the grid 13. A pair of angles 34, hinged at 35, at the outer ends of the side members 32 support the bearings 36 for the feed belt rollers 37. The outer of these is adjustably mounted on the angles 34 on slides 38 moved by screws 39. A handle 40 bolted to the angles 34 extends over and across the feed belt 20. The side members 32 supporting the grid are provided with handles 41. When it becomes necessary or desirable to get at the brush, the air ducts or the fleece chute, the feed belt can be swung upward on hinges 35 using the handle 40, and thereafter the side members 32 with the grid 13 and platform 12 can likewise be swung upward on pivot 31 using handles 41. As the feed belt rollers and their supporting angles are mounted upon the side members 32, they are carried with those members when they are swung upwardly, the parts taking the position in dotted lines in Figure 2.

In order that the feed belt may firmly press the skins against the brush and feed them to the feed rollers and the cutter, we have provided means for clamping it firmly against the brush and grid. These means comprise a rod 42 extending across the feed belt between its upper and lower flights and bolted by straps 43 to the angles 34. The outer ends of this rod are provided with hooks 44 designed to be engaged by toggle clamps 45 pivotally mounted on the arms 27. These clamps not only hold the feed belt in position, but also serve to hold rubber strips 46 on the grid firmly against the ends of the duct 21 of the brush housing and thus insure the passage of air between the ribs of the grid.

The feed rolls 15 and 16 are journalled in blocks slidably mounted within the forked upturned ends 47 of the arms 27. The upper roller 15 is positively urged toward the lower roll 16 by means of weighted arms 48. Any inequalities in the thickness of the skins, however, causes the upper roll to move away from the lower, so that the machine is not damaged.

The journals 49 for the rotary brush are adjustably mounted by bolts 50 extending through vertical slots in brackets 51 depending from the arms 27. As the brush wears, it can be moved upward and still held in operative relation to the skins being treated.

The bed plate knife 17 of the cutter is adjustably mounted for vertical adjustment within guides 52 by means of threaded bolts 53. Adjustment having been made, the blade is clamped within its guides by means of threaded bolt 54. The bed plate knife may also be adjusted laterally by means of threaded bolts 55 extending through a slot 56 in a plate 57 on which the guide plates 52 are mounted. By means of these adjustments the bed plate knife and the blades of the rotary knife can be kept in accurate shearing relation to each other.

The rotary brush, the rotary knife cylinder and feed rolls are driven from any suitable source of power as indicated in Figure 2. The feed belt is driven through a pinion 59 meshing with a pinion 60 which, in turn, meshes with a pinion 61 on the upper feed roller 15.

The operation of the machine is as follows: Assume the parts are in the position illustrated in Figure 1 with the brush rotating rapidly in a clockwise direction, the feed belt running with its lower flight moving toward the right, the feed rollers rotating at approximately the same peripheral speed as the feed belt, (the surface speed of the belt may be slower, to put tension on the skins) the knife cylinder rapidly rotating, the blower and the exhaust fan in operation. The operator places the skins fur side down on the platform 12 with the head of the skin foremost. The feed belt feeds them forward into contact with the bristles of the rapidly rotating brush which brushes them thoroughly, separates the fur fibers and loosens or removes any adhering dust or dirt. The brushing is toward the head, resulting in reversing the natural lay of the fur. (The position of the fur at different stages during the treatment is illustrated schematically by the three sketches above the feed belt. In these sketches, "T" is for tail; "H" is for head.) If the direction of rotation of the brush were reversed the fur would be laid properly for feeding to the cutter, but it is impossible to brush successfully away from the head, because the head of the skin, encountering the brush before the body portion tends to be rolled under. We therefore brush toward the head and in the direction of travel of the skin, relying upon the air currents to reverse the lay of the fur and place it in proper position for feeding to the cutter. Leaving the brush the skins are stripped from it by means of the ribs of the grid which extend into the bristles of the brush, and are then fed along the grid and subjected to the action of the air currents moving toward the brush. These air currents serve to reverse the direction of the hairs and to lay them in the natural position from head to tail and in proper condition for defleecing. The air also serves to remove any adhering dust or dirt. The skins are then fed along the grid to the feed rollers which positively feed them to the cutter where narrow strips of pelt are sheared off thus defleecing the skin. The fleece falls down in the space betwen the lower feed rolls and the bed plate knife onto the chute 25, while the cut pelt is discharged down chute 26.

Feeding the skins by hand to the feed rolls and cutter, as has been the practice in the past, is dangerous and often results in injury to the operator's fingers. Feeding the skins to the rubber conveyor belt in accordance with our invention eliminates this danger.

The brushing and cleaning part of the machine comprising the brush, the feed belt, the grid and the air ducts and their connections can be used as an adjunct of the carroting operation or wherever it is necessary or desirable to brush and clean skins.

We claim:

1. The method of treating animal skins which comprises feeding the skins head-foremost to a rotary brush rotating in the direction of travel of the skins but at a greater peripheral speed and then subjecting the brushed skins to an air current passing from head to tail to remove dust and lay the fur.

2. The method of defleecing animal skins which comprises brushing the fur in one direction, reversing the direction with an air current and feeding the skins to a defleecing cutter in a direction counter to the air current.

3. The method of defleecing animal skins which comprises feeding the skins head-foremost to a rotary brush rotating in the direction of travel of the skins but at a greater peripheral speed, subjecting the brushed skins to an air current, passing from head to tail to lay the fur, and feeding the brushed skins head-foremost to a defleecing cutter.

4. A machine for treating animal skins comprising a brush, a plurality of spaced members beyond the brush having portions extending between the bristles of the brush and means for moving the skins into contact with the brush and along the members.

5. A machine for treating animal skins comprising a brush, a support at one side of the brush over which the skins are advanced to be acted on by the brush, a plurality of spaced supporting members beyond the brush having portions extending between the bristles of the brush, and an endless feed belt for moving the skins over the brush and the supporting members.

6. A machine for treating animal skins comprising a brush, a plurality of spaced members beyond the brush having portions extending between the bristles of the brush, means for moving the skins into contact with the brush and along the members, and means for passing an air current between the supporting members and toward the brush.

7. A machine for defleecing animal skins comprising means for brushing the skins thereby causing the fur to lie in one direction, means for reversing that direction, defleecing means and means for feeding the skins to the brushing means, the fur reversing means and the defleecing means successively.

8. A machine for defleecing animal skins comprising means for brushing the skins, thereby causing the fur to lie in one direction means for passing a current of air over the brushed skins to lay the fur in the reverse direction, a defleecing cutter, and means for feeding the skins to the brushing means, the air current and the cutter successively.

9. A machine for defleecing animal skins comprising a rotary brush, a defleecing cutter, a ribbed grid between the brush and the cutter, and means for feeding the skins into contact with the brush and along the grid and to the cutter.

10. A machine for defleecing animal skins comprising a rotary brush, a defleecing cutter, a ribbed grid between the brush and the cutter, means for passing a current of air through the grid and toward the brush and means for feeding the skins into contact with the brush and along the grid and to the cutter.

11. A machine for defleecing animal skins comprising a rotary brush, a defleecing cutter, a ribbed grid between the brush and the cutter, means for passing a current of air through the grid and toward the brush, means for rotating the brush toward the cutter, and means for feeding the skins into contact with the brush and along the grid and to the cutter at a speed less than the peripheral speed of the brush.

12. A machine for defleecing animal skins comprising a rotary brush, a defleecing cutter, a ribbed grid between the brush and the cutter, the ribs of the grid extending into the bristles of the brush, and means for feeding the skins into contact with the brush and along the grid and to the cutter.

13. A machine for defleecing animal skins comprising a rotary brush, a defleecing cutter, a ribbed grid between the brush and the cutter, the ribs of the grid extending into the bristles of the brush, means for passing a current of air through the grid and toward the brush and a feed belt for feeding the skins into contact with the brush and along the grid and to the cutter.

14. A machine for defleecing animal skins comprising a rotary brush, a defleecing cutter, a pair of feed rolls closely adjacent the cutter, a ribbed grid extending from the brush to the feed rolls, means for passing a current of air through the grid and toward the brush, and means for feeding the skins into contact with the brush and along the grid and to the cutter.

15. A machine for defleecing animal skins comprising a rotary brush, a defleecing cutter, a ribbed skin-supporting grid between the brush and the cutter, means for passing a current of air through the grid and toward the brush, means for rotating the brush toward the cutter and a feed belt for feeding the skins over the brush and the grid and to the cutter.

16. A machine for defleecing animal skins comprising a rotary brush, a housing for the brush, a defleecing cutter, a ribbed skin-supporting grid between the brush and the cutter, a blower for forcing a blast of air through the grid and into the brush housing, a suction fan drawing air from the brush housing, and means for feeding the skins over the brush and the grid and to the cutter.

17. A machine for defleecing animal skins comprising a rotary brush, a defleecing cutter, a ribbed skin-supporting grid between the brush and the cutter, means for passing a current of air through the grid and toward the brush, a feed belt for feeding the skins over the brush and the grid and to the cutter, and discharge chutes for fleece and pelts adjacent the cutter.

18. A machine for defleecing animal skins comprising a rotary brush, a defleecing cutter, a ribbed skin-supporting grid between the brush and the cutter, means for passing a current of air through the grid and toward the brush, a feed belt for feeding the skins over the brush and the grid and to the cutter, and discharge chutes for fleece and pelts adjacent the cutter, the grid and feed belt being pivotally mounted whereby they can be swung outward to afford access to parts of the machine lying below them.

19. A machine for treating animal skins comprising a rotary brush, a ribbed grid extending beyond the brush the ribs of which extend into the bristles of the brush, and a belt for moving the skins past the brush and along the grid.

LOUIS N. MESSING.
ROBERT E. NAUMBURG.